United States Patent [19]
Aldridge

[11] Patent Number: 5,381,950
[45] Date of Patent: Jan. 17, 1995

[54] ZONE SENSOR OR THERMOSTAT WITH FORCED AIR

[75] Inventor: Richard L. Aldridge, Indianapolis, Ind.

[73] Assignee: American Standard Inc., N.J.

[21] Appl. No.: 139,345

[22] Filed: Oct. 20, 1993

[51] Int. Cl.$^6$ .............. F04B 17/00; G01K 1/00
[52] U.S. Cl. .................. 236/1 R; 236/DIG. 19; 337/380; 374/208; 417/410.2
[58] Field of Search .......... 417/410 A; 236/DIG. 19, 236/1 R; 337/380, 327; 374/208

[56] References Cited

U.S. PATENT DOCUMENTS

| | | | |
|---|---|---|---|
| 2,160,740 | 5/1939 | Hutchins | 236/DIG. 19 |
| 2,192,748 | 3/1940 | Knight | 236/DIG. 19 |
| 2,419,077 | 4/1947 | Isserstedt | 236/DIG. 19 |
| 3,557,616 | 9/1967 | Landon, Jr. et al. | 73/228 |
| 3,913,832 | 10/1975 | Dean, Jr. | 236/49 |
| 4,141,496 | 2/1979 | Duchek | 236/49 |
| 4,312,235 | 1/1982 | Daigle | 73/861 |
| 4,347,443 | 8/1982 | Whitney | 307/117 |
| 4,498,851 | 2/1985 | Kolm | 417/410 A |
| 4,587,403 | 5/1986 | Shapess | 219/366 |
| 4,596,153 | 6/1986 | Macdonald et al. | 73/861 |
| 4,659,236 | 4/1987 | Hobbs | 374/208 |
| 4,715,190 | 12/1987 | Han et al. | 62/201 |
| 5,039,009 | 8/1991 | Baldwin et al. | 236/51 |
| 5,042,265 | 8/1991 | Baldwin et al. | 62/127 |
| 5,114,070 | 5/1992 | Lilja et al. | 236/49 |
| 5,161,387 | 11/1992 | Metcalfe et al. | 62/126 |
| 5,224,648 | 7/1993 | Simon et al. | 236/51 |
| 5,237,826 | 8/1993 | Baldwin et al. | 62/77 |

OTHER PUBLICATIONS

Piezo Systems Inc., "Piezo Systems Solid State Motion Technologies", Undated.

Primary Examiner—William E. Wayner
Attorney, Agent, or Firm—William J. Beres; William O'Driscoll; Peter D. Ferguson

[57] ABSTRACT

A wall mounted thermostat or zone sensor designed for sensing the temperature in the zone in which the thermostat is mounted. The thermostat is in communication with and controls a heating, ventilation and air conditioning system. The thermostat includes a temperature sensor contained within an internal space defined by a cover. The temperature sensor is adapted for sensing the temperature of the air in the zone in which the thermostat is mounted. An electrostatically powered fan for generating a continual flow of zone temperature air to the sensor is positioned within the thermostat. The cover has openings to facilitate the drawing of room temperature air from the zone in a direction generally perpendicular to the zone wall to which the thermostat is mounted and for directing the air to the fan for discharge across the temperature sensor and out of the thermostat in a direction generally parallel of the zone wall.

14 Claims, 2 Drawing Sheets

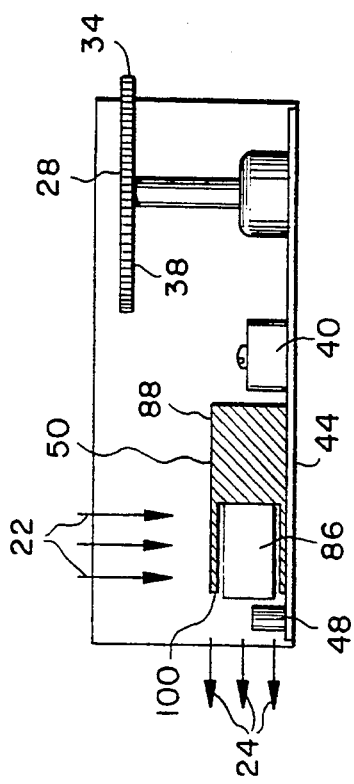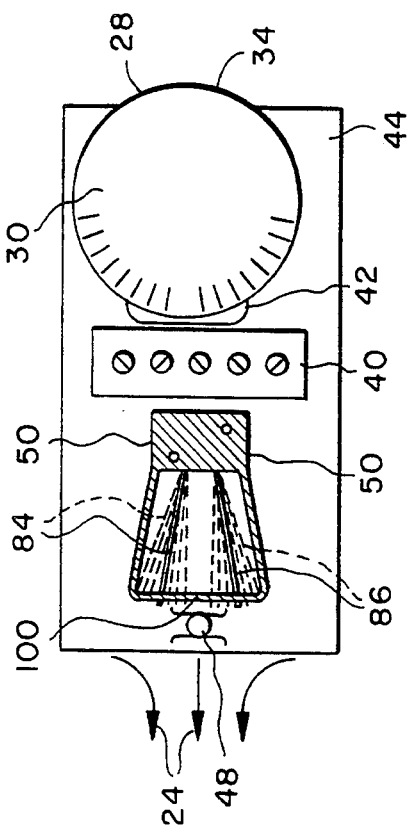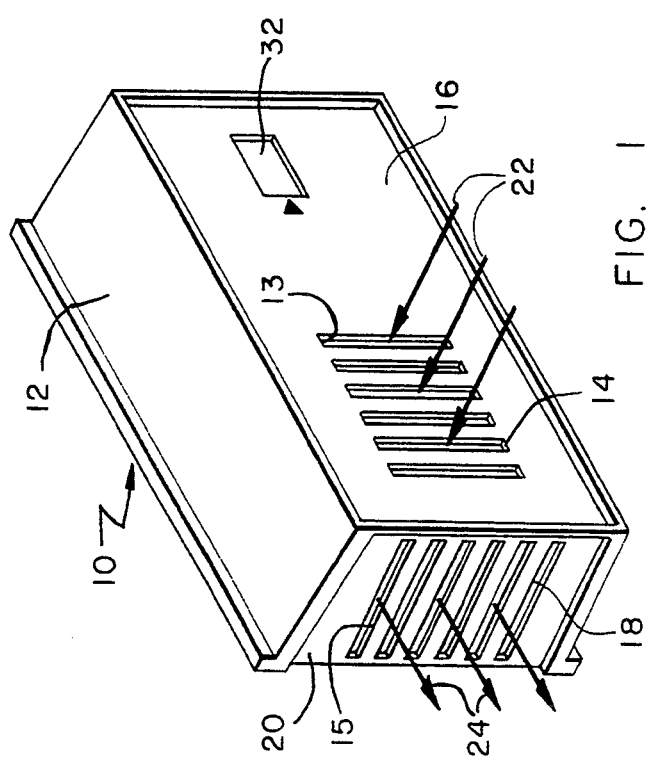

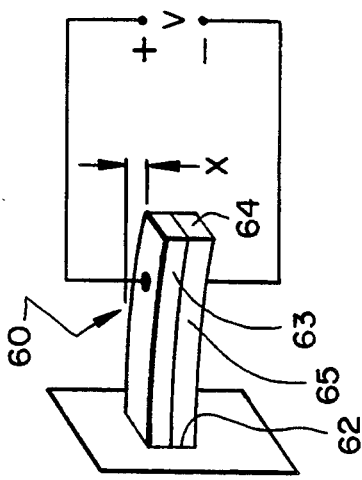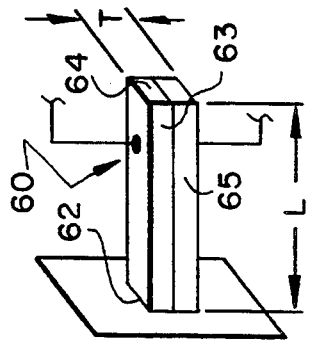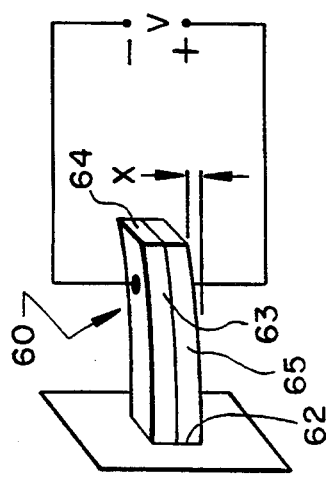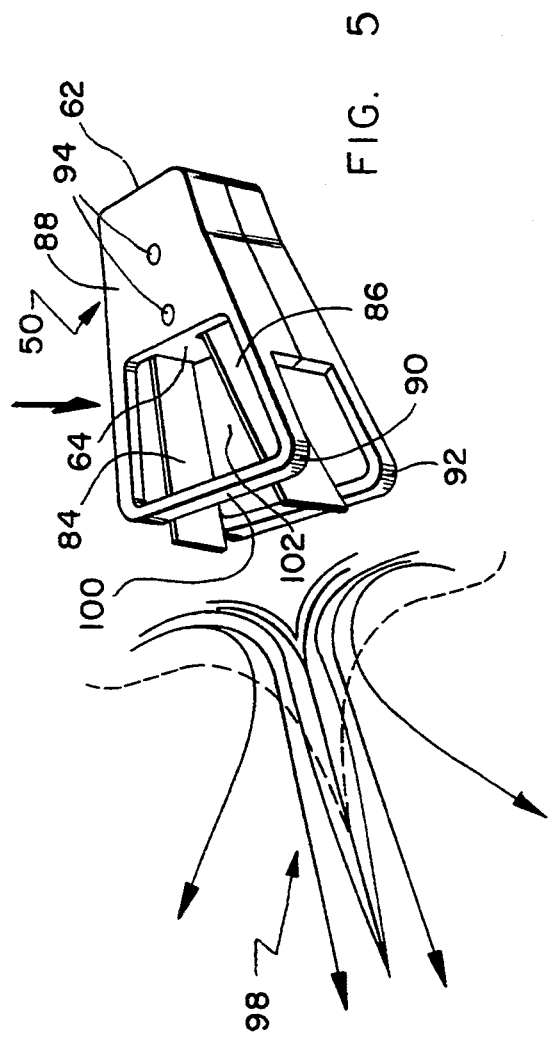

ZONE SENSOR OR THERMOSTAT WITH FORCED AIR

TECHNICAL FIELD

The present invention relates to sensors utilized to sense the temperature of a zone for control of a heating, ventilation, and air conditioning (HVAC) system. More specifically, it relates to a flush, wall mounted sensor/thermostat that includes a fan to force air drawn from the zone across the sensor. Although the zone sensor or thermostat (which are interchangeable for purposes of this invention), preferably monitors zone temperature, the invention is also useful in monitoring the status of indoor air quality, carbon dioxide levels, humidity or the like. In this regard, the invention will be discussed in terms of temperature sensing by a zone sensor or thermostat but is intended to encompass the sensing of the criteria just noted.

BACKGROUND OF THE INVENTION

Thermostats have long been used to control HVAC systems. Zone sensors have also been used to provide signals indicative of a zone's status. The primary difference between a zone sensor and a thermostat is that the zone sensor provides a signal representative of a monitored condition, while a thermostat typically provides a command based upon the difference between the monitored condition and a setpoint. Since both zone sensors and thermostats each monitor a zone condition, they are considered interchangeable for purposes of the present invention.

Thermostats are typically mounted on a wall in the space or zone that is being heated or air conditioned at approximately four feet of height from the floor. The flow of air is impaired along the interior wall of a zone. Friction of the flowing air with the wall surface creates a boundary layer of air adjacent to the wall surface that impedes the passage of free zone air to the wall surface. This induces a significant delay in the thermostat sensing the actual room temperature. Additionally, the mass of the wall itself acts as a heat sink because it draws off some of the heat of the air passing over the wall. Accordingly, the thermostat is affected by air that is not truly representative, on a real time basis, of the air temperature of the zone. Clearly, a better location for sensing of the zone temperature would be an unobstructed portion of the zone where the heated or cooled air freely flows. In such a location, a sensor would receive an adequate supply of zone air and the air received would accurately reflect the temperature conditions of the air temperature in the zone in real time. Aesthetic and functional reasons, however, dictate that thermostats be wall mounted for most air conditional spaces and zones.

Consequently, there is a need to reduce the delay in sensing the actual zone temperature by a thermostat. A substantial delay in determining zone temperatures results in the HVAC system being out of synchronization with the temperature in the zone. The problem is exacerbated when changing the setpoint of the thermostat. This may occur in the morning, for instance, when the thermostat setting is changed, usually automatically, from an unoccupied setting to a more comfortable occupied setting. As a result of the lag in sensing the actual zone temperature, the HVAC system typically overshoots the new setpoint, causing the temperature to rise significantly above the new setpoint. This overshoot is both inefficient from an energy usage standpoint and is uncomfortable to the occupants of the zone. In many applications, it takes the overshoot several hours to dissipate before the temperature in the zone matches the setpoint.

As a partial solution to the above problems, thermostats have typically been made to protrude out into the zone. By moving the sensor out away from the wall, it was assumed that the sensor was free of the slowly moving boundary air along the wall and also free of the effects of the thermal mass of the wall. Aesthetic considerations, however, have dictated that the protrusion into the zone be minimized. Accordingly, present thermostats usually protrude only a small distance away from their supporting wall and into the zone.

The problem of inducing the flow of zone temperature air across a thermostat and through the protective cover of the thermostat has been a recurring issue within the industry. An early attempt to solve the problem with thermostats used in conjunction with pneumatic control systems is illustrated in U.S. Pat. No. 3,913,832. The '832 patent recognizes the need for accurate measurement of zone air temperature on a continual basis. Since the thermostat of the '832 patent already had a supply of air that was utilized in the pneumatic control system, the proposed solution to the air flow problem was to induce the flow of zone temperature air by using a T-shaped tube. The T-shaped tube had pneumatic supply air flowing in it and utilized that flow to create a venturi effect to draw a flow of zone temperature air into the thermostat housing.

A second idea to ensure that the ambient air temperature was continually being sensed is detailed in U.S. Pat. No. 4,141,496. As in the '832 patent, the '496 patent deals with the problem of temperature sensing in a pneumatically controlled system. The compressed pneumatic control air in the '496 system is directed through a nozzle to create a suction in a line downstream of the nozzle. The line was introduced into a chamber, creating a partial vacuum in the chamber. The chamber contained the sensor and had an opening into the zone. The vacuum drew ambient air into the chamber to be sensed by the sensor. Both the '832 patent and the '496 patent rely on the availability of pressurized control air and are not applicable to HVAC control systems that are not pneumatically controlled.

With the advent of electronic thermostats, there has been no adequate means of inducing flow to the sensor. U.S. Pat. No. 4,659,236 addresses the problem of dissipating the heat generated by electronics integral to a thermostat housing. The '236 patent acknowledges that the two approaches to improve the accuracy of a thermostat's electronic temperature sensor, e.g., having the thermostat project further into the zone and using the wall as a heat sink, have not been successful. The solution proposed by the '236 patent is to incorporate a thermal shield between the heat generating components and the temperature sensor. While the shield may minimize the effect of heat build up caused by the electronic components, it does not address the problem of air flow across the sensor.

Isolation of heat generating elements from the sensor of a thermostat is also evident in U.S. Pat. No. 4,347,443. The '443 patent relates to electronic thermostats and discloses a projecting, room thermostat that includes an air-wash through-passage for sensing room temperature. The air-wash also removes the heat generated by the electronic components. The '443 design requires a mounting for the thermostat with a space between the back side of the circuit board and a cover to allow airflow over the circuit board. A shield on the front side of the circuit board is required to shield the temperature sensor from the heat generated by a power supply circuit and a signal output circuit. The '443 patent relies on convection for air flow across the sensor.

While each of the above-described patents recognize the problem of requiring a flow of ambient zone air across the sensor of a thermostat, the solutions proposed rely on either the pressure of compressed air in pneumatic thermostats or on passive heat shields used in combination with convective air flow in electronic thermostats. A thermostat which presented a very shallow depth for aesthetic purposes, but was continually, actively supplied with an adequate sample of zone air under all conditions of air movement, without requiring the availability of pneumatic air, or without relying primarily on convective air flow, would provide decided advantages.

SUMMARY OF THE INVENTION

The present invention meets the objectives of having a flush mounted or nearly flush mounted thermostat that provides an adequate supply of room temperature air to the sensor contained within the thermostat. The present invention meets this objective by including a fan within the thermostat housing that has a right angle path of air flow, such that the ambient air is drawn from the front of the thermostat that faces into the zone and is exhausted from the side(s) of the thermostat. This orientation minimizes the depth of the thermostat housing that is required, while ensuring adequate air flow to the sensor and through the thermostat housing, and also ensuring that the ambient air is drawn from the furthest projection of the thermostat into the zone.

The fan preferably used in the thermostat of the invention is a solid state, piezoelectric device. Piezoelectric fans are very small in size, have no rotating parts, have exceptionally low electromagnetic interference characteristics, consume a minimum amount of power, and generate very little heat. The present invention incorporates the features of piezoelectric fans into a thermostat design that ensures adequate air flow across the thermostat temperature sensor. In particular, a piezoelectric fan having a pair of oscillating blades is oriented within the thermostat such that the blades oscillate in a plane generally parallel to the face of the wall on which the thermostat is mounted. The temperature sensor is oriented generally in front of, and equidistant from the tips of the oscillating blades. Louvers in the front face of the housing of the thermostat direct intake air to the oscillating blades in a path of travel generally perpendicular to the wall surface, and exhaust air from the thermostat through louvers in a side face of the housing in a path of travel generally parallel to the wall surface. Although the preferred embodiment of the invention is disclosed in terms of piezoelectric fans, other suitable fans, such as rotary fans, are also contemplated.

BRIEF DESCRIPTION OF THE DRAWINGS

FIG. 1 is a perspective view of a thermostat in accordance with the present invention, with arrows depicting air flow through the thermostat cover.

FIG. 2 is a bottom plan view of the thermostat with the cover removed.

FIG. 3 is a front elevational view of the thermostat with the cover removed.

FIG. 4a is a schematic view of a piezoelectric device with no voltage applied thereto.

FIG. 4b is similar to FIG. 4a, but with a voltage of certain polarity presented thereto.

FIG. 4c is similar to FIG. 4b, but with a voltage of opposite polarity presented thereto.

FIG. 5 is a perspective view of a piezoelectric fan having a pair of fan blades, with flow lines depicting the path of air induced by the blades.

DETAIL DESCRIPTION OF THE DRAWINGS

FIG. 1 depicts a thermostat, shown generally at 10, adapted for mounting on the wall of a zone to be heated or cooled. The thermostat 10 includes a cover 12 typically constructed of a synthetic resin material that has a cosmetic or aesthetic design and that defines an interior space enclosing the various components that comprise the thermostat 10. The cover 12 has an ingress 13 including a plurality of intake louvers 14 in the front face 16 thereof and at least one egress 15 including a plurality of exhaust louvers 18 in a side face 20 thereof. Intake air into the ingress 13 is indicated by arrows 22 and exhaust air from the egress 15 is indicated by arrows 24. As indicated, the intake air 22 is drawn through the front face 16 of the cover 12. This ensures that the air drawn into the interior of the thermostat 10 is drawn from the furthest projection of the thermostat 10 into the zone. At the furthest projection, the air is most nearly equal to the actual ambient temperature in the zone at that specific time. The exhaust air 24 is exhausted at an angle generally perpendicular to the intake air 22.

The thermostat 10 typically includes a means by which the HVAC system temperature setpoint is set. In the preferred embodiment as shown in FIGS. 2 and 3, rotary potentiometer 28 is provided for the user to establish the HVAC setpoint. The rotary potentiometer 28 typically has the temperature set points etched on the face 30 thereof. Preferably, the exterior cover 16 of the thermostat 10 has a transparent window 32 that displays a portion of rotary indicator 28 so that the user has a visual reference of the temperature that is set. A portion 34 of the rotary indicator 28 projects through a slot in the side of thermostat unit 10 and is exposed for manipulation by the user in setting the setpoint. Serrations 38, best viewed in FIG. 2, on the outer periphery of rotary potentiometer 28 permit the user to easily manipulate the setting of rotary potentiometer 28. Alternatively, the setpoint can be entered digitally using up/down switches or a keypad (not shown). The reader will recognize that the zone sensor implementation will not require setpoint means since the monitored condition is transmitted to a conventional controller. Representative controllers and transmission schemes are shown in commonly assigned U.S. Pat. No. 5,224,648 to Simon, deceased et al., U.S. Pat. No. 5,161,387 to Metcalfe et al., U.S. Pat. No. 5,114,070 to Lilja et al., U.S. Pat. Nos. 5,042,265; 5,237,826 and 5,039,009 to Baldwin et al. and 4,715,190 to Han et al. Each of these patents is hereby incorporated by reference herein.

A terminal block 40 for electrical connectors is provided to connect the thermostat 10 to a power source, typically the home electrical system, and to the HVAC system. Wiring for such connections is typically brought in through the back of the thermostat 10 by means of an aperture 42 formed in a back plate 44 of the thermostat 10.

A sensor 48 is located within the thermostat 10. The sensor 48 is preferably a temperature sensor but carbon dioxide sensors, humidity sensors, indoor air quality sensors, and the like are also contemplated. The temperature sensor 48 is preferably a conventional temperature transducer but can also be implemented in other ways such as a thermistor or the like. The sensor 48 is designed for utilization with electronically operated and controlled HVAC systems. It is desirable that the sensor 48 be located within the thermostat 10 and be positioned so as to receive a continual supply of ambient air from the zone in which the thermostat 10 is located. Accordingly, the sensor 48 is positioned proximate to the egress 15 and in the path of air impelled by a fan 50.

The fan 50 is positioned to intake air through the ingress 13 and exhaust air perpendicularly out the egress 15. When the thermostat 10 is mounted on a wall, these directions result in intake air flow perpendicular to the wall surface and exhaust air flow parallel to the wall surface. This allows a thinner thermostat profile while providing better airflow across the sensor 48. If the egress 15 is angled to direct air out from the wall, the thermostat 10 can be substantially flush mounted on the wall.

In the preferred embodiment, the fan 50 is a piezoelectric fan, although other suitable fans are also contemplated. With reference to FIGS. 4a, 4b, and 4c, the fan 50 includes a piezoceramic transducer 60 that, when stressed electrically by a voltage, alters its physical orientation. Removal of the electrical stress causes the piezoelectric element to return to its original, unstressed orientation. Relationships between the applied voltage force and the resulting responses of the piezoceramic transducer 60 depend upon the piezoelectric properties of the ceramic, the size and shape of the piece of piezoceramic material, and the direction of the electrical excitation.

Deflection of the piezoceramic transducer 60 is as indicated by the following equation:

$$x = 2\, LVd/T$$

where x equals deflection, L equals length of the transducer from an anchor point, V equals the voltage applied, and T equals the thickness of the transducer. The constant d is the piezoelectric constant relating mechanical strain and applied electrical field, defined as the ratio of strain to field.

The piezoceramic transducer 60 is a cantilever device, anchored at a first end 62 with a second end 64 free to translate. L is shown as the length of the piezoelectric transducer 60 between the first end 62 and the second end 64. The thickness T is shown as the thickness of the piezoelectric transducer 60. The piezoceramic transducer 60 is formed of two or more piezoceramic elements 63, 65, bonded together. It is the working of the two elements 63, 65 with respect to one another responsive to the imposition of a voltage that produces the rapid bending oscillation of the piezoceramic transducer 60.

As indicated, the piezoelectric transducer 60 bends in response to an applied voltage. The amount of deflection is indicated by the distance X in FIGS. 4b and 4c. Reversing polarity as indicated in FIG. 4c with respect to the polarity shown in FIG. 4b, results in deflection X in the opposite direction as that indicated in FIG. 4b. It is this alternating deflection, X, that gives rise to the useful oscillation of the piezoelectric transducer 60 as a fan motor. By rapidly alternating the polarity of the voltage applied to the piezoceramic transducer 60, a rapid oscillating, bending motion is induced in the piezoceramic transducer 60. In practice, piezoceramic transducer 60 is designed to be driven at the resonant frequency of the fan blades by the applied voltage V.

A piezoelectric fan 50 suitable for use in the invention is the Model B fan produced by Piezoelectric Products, Inc., 212 Durham Ave., Metuchen, N.J. and is shown generally in FIG. 5. It is understood that other suitable fan designs are available and may be incorporated in the present invention in the alternative. First end 63 of the fan 50, is the anchored end, with the second end 64 being free to translate. One or more fan blades 84, 86 are bonded to the piezoceramic elements 63, 65 of a piezoceramic transducer and contained integral with a fan housing 88. Construction materials of the fan blades 84, 86 include, for example, mylar and stainless steel. The materials are selected to have a certain resilience and yet display certain bending characteristics when oscillated.

The fan housing 88 is designed with U-shaped extensions 90, 92. The U-shaped extensions 90, 92 provide a degree of protection for the fan blades 84, 86, while at the same time facilitating the ingress of zone temperature air to the fan blades 84, 86 and the egress of accelerated air therefrom. Mounting holes 94 are bores that penetrate the housing 88 in order to facilitate the mounting of the fan 50 the backing plate 44 as by screws or the like.

A typical flow distribution from the fan 50 is as depicted at 98. It should be noted that the distribution 98 indicates that the greatest velocity emanating from fan 50 is in a rather narrow area directly in front of the fan 50. Velocity of the air stream approximately one inch from the mouth 100 is 500 feet per minute. As indicated, the air enters the fan 50 through the aperture 102 formed by the U-shaped extension 90 and exits the fan 50 through the mouth 100.

In operation, a voltage is applied to the piezoceramic transducer contained within the housing 88 of the fan 50. The piezoceramic transducer is designed to be compatible with and driven by typical household voltages. The application of the alternating voltage to the piezoceramic transducer in fan 50 causes oscillation of the fan blades 84, 86, as indicated in FIG. 3. Oscillation occurs at the resonant frequency of the fan blades 84, 86 of the piezoelectric fan 50 and produces the volume of air indicated at 98 in FIG. 5. Piezoelectric fans of suitable physical dimensions and power consumption for incorporation into a thermostat are known to cause air flows that approximate seven cubic feet per minute. Such air flows are adequate for the purpose of providing adequate zone temperature air to the sensor 48 for accurate sensing of the zone air temperature.

It should be noted that piezoelectric fans 50 achieve their best performance when operated in the absence of a pressure head. Accordingly, the louvers 14, 18, depicted in FIG. 1, are designed with respect to the volume of air being moved by the fan 50 and the parameters of the interior space of thermostat 10 such that the air is passed by the fan 50 without generating a pressure head against which the fan 50 must work.

The piezoelectric fan 50 draws zone temperature air in through the intake louvers 14. The intake louvers 14 are located in front face 16 of cover 12. As previously indicated, this location optimizes the intake of zone temperature air, since the location of intake louvers is directed away from and is the furthest possible distance from the wall to which thermostat 10 is mounted. As previously noted, the wall gives rise to errors in the sensed temperature by acting as a heat sink and causing the stagnation of airflow. Air for sensing is then drawn straight into the interior of thermostat 10 from the zone perpendicular to the wall on which thermostat 10 is mounted. The air enters the fan 50 through the aperture 102 in U-shaped extension 90 and is accelerated by the oscillating fan blades 84, 86 of the piezoelectric fan 50.

The accelerated zone temperature air is exhausted through the mouth 100 of the fan 50 and is directed across the temperature sensor 48. The temperature sensor 48 is affected by the zone temperature air. Due to the continual flow of air at a relatively high velocity as provided by the fan 50, the temperature sensor 48 is able to provide a temperature to thermostat 10 that is a more nearly a real-time measurement of the actual temperature in the zone. Thus, the thermostat 10 is much more able to accurately control the temperature of the air in the zone through providing control signals to the HVAC system that much more accurately represent the actual conditions existing in the zone.

After passing the sensor 48, the air provided by the fan 50 is exhausted from the thermostat 10 through the exhaust louvers 18. As previously indicated, the piezoelectric fan 50 does not operate well against a pressure head. Accordingly, the louvers 14, 18 in the cover 12 of thermostat unit 10 are designed to freely admit and to exhaust room air without development of a pressure head within thermostat unit 10.

Since many possible embodiments may be made of the invention without departing from the scope thereof, it is to be understood that all matter herein set forth or shown in the accompanying drawings is to be interpreted as illustrative and not in a limiting sense. Additionally, thermostats and zone sensors are interchangeable for purposes of this invention. Furthermore, the invention is not intended to be limited to temperature sensors but to also include indoor air quality sensors, carbon dioxide sensors, oxygen sensors and humidity sensors.

I claim:

1. A sensor adapted to sense an ambient condition in a zone and to control an air conditioning system to affect the temperature or airflow in the zone as a function of the sensed ambient condition, the zone including at least one planar location comprising:
   a cover adapted for operable mounting to the planar location, said cover including a cover face projecting into said zone and at least one side faces extending between said cover face and the planar location;
   an ambient condition sensor mounted within said cover; and
   fan means positioned within said cover proximate the ambient condition sensor for delivering a flow of air to the ambient condition sensor;
   said cover including structure defining an air intake oriented to divert air to said fan means along an intake path of travel through said cover face, said fan means being oriented to divert air across said sensor along an exhaust path of travel in a direction transverse to said intake path of travel; said intake path of travel being oriented generally perpendicular to said planar location, and said exhaust path of travel being oriented generally parallel to said planar location; wherein the cover face includes structure defining first louvers adapted for directing ambient air to the intake port to the fan means in a path generally perpendicular to the face of the wall and wherein at least one of said side faces includes structure defining second louvers adapted for exhausting the outlet air from the exhaust port of the fan means in a direction generally parallel to the face of the wall; whereby said sensor is provided with a continuous flow of ambient air taken from within said zone.

2. A sensor as claimed in claim 1 wherein the ambient condition being sensed is temperature, humidity, carbon dioxide, or indoor air quality.

3. A sensor as claimed in claim 2 wherein the fan means includes a piezoceramic element and a pair of fan blades operably coupled to said piezoceramic element for oscillation of said blades by said element in a plane generally parallel to the planar location on which the sensor is mounted.

4. A sensor as claimed in claim 1 wherein the fan means is an electrostatically powered fan.

5. A sensor as claimed in claim 4 wherein the fan means is a piezoelectric fan.

6. A sensor as claimed in claim 1, the sensor including a housing defining an inner cavity for receiving the fan means and the sensor, said housing including an outwardly directed face, having at least one intake louver means defined therein for intaking zone air to the cavity.

7. A sensor as claimed in claim 6, the fan means including inlet means disposed proximate to and facing the intake louver means for receiving the zone air from the intake louver means.

8. A sensor as claimed in claim 6 wherein the ambient condition sensed is representative of temperature, humidity, carbon dioxide, or indoor air quality.

9. A sensor as claimed in claim 6, the sensor being substantially flush to the wall upon which the sensor is mounted.

10. A sensor as claimed in claim 9, wherein the condition sensed by the sensor is representative of temperature, humidity, indoor air quality or carbon dioxide level.

11. A sensor as claimed in claim 1, the fan means having a mouth adapted for the discharge of air accelerated by the fan means onto the sensor.

12. A sensor as claimed in claim 11 wherein the fan means is operated in a powered condition on a continual basis.

13. A sensor as claimed in claim 12 wherein the fan means is adapted to be powered by common household electric power.

14. A sensor as claimed in claim 1 wherein the fan means is a piezoelectric fan.

* * * * *